United States Patent
Stickelmann

(10) Patent No.: US 11,901,805 B2
(45) Date of Patent: Feb. 13, 2024

(54) METHOD FOR SWITCHING OFF POWER SEMICONDUCTOR SWITCHES IN A BRIDGE CIRCUIT, BRIDGE CIRCUIT, AND INVERTER COMPRISING A BRIDGE CIRCUIT

(71) Applicant: SMA Solar Technology AG, Niestetal (DE)

(72) Inventor: Uwe Stickelmann, Kaufungen (DE)

(73) Assignee: SMA Solar Technology AG, Niestetal (DE)

(*) Notice: Subject to any disclaimer, the term of this patent is extended or adjusted under 35 U.S.C. 154(b) by 280 days.

(21) Appl. No.: 17/405,331

(22) Filed: Aug. 18, 2021

(65) Prior Publication Data

US 2021/0384817 A1   Dec. 9, 2021

Related U.S. Application Data

(63) Continuation of application No. PCT/EP2020/054048, filed on Feb. 17, 2020.

(30) Foreign Application Priority Data

Feb. 19, 2019 (DE) .................. 10 2019 104 145.7

(51) Int. Cl.
*H02M 1/32* (2007.01)
*H02M 1/36* (2007.01)
(Continued)

(52) U.S. Cl.
CPC .............. *H02M 1/32* (2013.01); *H02M 1/36* (2013.01); *H02M 7/487* (2013.01); *H02M 7/521* (2013.01)

(58) Field of Classification Search
CPC .......... H02M 1/32; H02M 1/36; H02M 7/487; H02M 7/521
See application file for complete search history.

(56) References Cited

U.S. PATENT DOCUMENTS

| 7,508,640 B2 | 3/2009 | Knapp |
| 10,951,131 B2 * | 3/2021 | Shi .................. H02M 7/487 |

(Continued)

FOREIGN PATENT DOCUMENTS

| CN | 109088559 A | 12/2018 |
| CN | 10932715 A | 2/2019 |

(Continued)

OTHER PUBLICATIONS

International Search Report dated May 11, 2020 in connection with PCT/EP2020/054048.

(Continued)

*Primary Examiner* — Jue Zhang
(74) *Attorney, Agent, or Firm* — Eschweiler & Potashnik, LLC

(57) ABSTRACT

A method for switching off power semiconductor switches in a bridge circuit having first through sixth power semiconductor switches. The method includes a switch-off process for establishing a final switch configuration in which all power semiconductor switches in the bridge circuit are in a switched-off state. Over the course of the switch-off process, a switch configuration is established in which the fifth power semiconductor switch and the sixth power semiconductor switch are concurrently in a switched-on state, while the first power semiconductor switch and the fourth power semiconductor switch are in a switched-off state. Also disclosed is a bridge circuit having a control circuit configured to carry out such a method. In addition, an inverter that includes at least one bridge circuit of this type is also provided.

18 Claims, 12 Drawing Sheets

(51) Int. Cl.
*H02M 7/487* (2007.01)
*H02M 7/521* (2006.01)

(56) References Cited

U.S. PATENT DOCUMENTS

| | | |
|---|---|---|
| 2004/0244939 A1 | 12/2004 | Marti |
| 2011/0013438 A1 | 1/2011 | Frisch |
| 2014/0268940 A1 | 9/2014 | Viitanen |
| 2015/0016169 A1* | 1/2015 | Honea .................. H02M 7/483 363/132 |
| 2016/0043659 A1* | 2/2016 | Xu ....................... H02M 1/088 363/131 |
| 2017/0185130 A1* | 6/2017 | Zhang ................ H01L 29/1608 |
| 2018/0316277 A1* | 11/2018 | Mueller ............... H02M 7/493 |

FOREIGN PATENT DOCUMENTS

| | | |
|---|---|---|
| DE | 10140747 A1 | 3/2002 |
| EP | 2184844 A1 | 5/2010 |

OTHER PUBLICATIONS

Gleissner Michael et al.; "Comparison of fault tolerant multilevel inverters"; 2017 19th European Conference on Power Electronics and Applications (EPE'17 ECCE Europe), Jointly Owned IEEE-PELS and EPE Association; Sep. 11, 2017.

Daniel Andler et al.; "Experimental Investigation of the Commutations of a 3L-ANPC Phase Leg Using 4.5-kV 5.5-kA IGCTs"; IEEE Transactions on Industrial Electronics, IEEE Service Center, Piscataway, NJ, USA, vol. 60, No. 11, Nov. 1, 2013.

* cited by examiner

|     | T1 | T2 | T3 | T4 | T5 | T6 |
|-----|----|----|----|----|----|----|
| K-A | 1  | 1  | 0  | 0  | 0  | 1  |
| K-1 | 1  | 0  | 0  | 0  | 0  | 1  |
| K-2 | 0  | 0  | 0  | 0  | 0  | 1  |
| K-3 | 0  | 0  | 0  | 0  | 1  | 1  |
| K-O | 0  | 0  | 0  | 0  | 0  | 0  |

Fig. 2

| K   | T1 | T2 | T3 | T4 | T5 | T6 |
|-----|----|----|----|----|----|----|
| K-B | 1  | 0  | 1  | 0  | 0  | 1  |
| K-4 | 0  | 0  | 1  | 0  | 0  | 1  |
| K-2 | 0  | 0  | 0  | 0  | 0  | 1  |
| K-3 | 0  | 0  | 0  | 0  | 1  | 1  |
| K-0 | 0  | 0  | 0  | 0  | 0  | 0  |

Fig. 3

|     | T1 | T2 | T3 | T4 | T5 | T6 |
|-----|----|----|----|----|----|----|
| K-A | 1  | 1  | 0  | 0  | 0  | 1  |
| K-2 | 0  | 0  | 0  | 0  | 0  | 1  |
| K-3 | 0  | 0  | 0  | 0  | 1  | 1  |
| K-2 | 0  | 0  | 0  | 0  | 0  | 1  |
| K-O | 0  | 0  | 0  | 0  | 0  | 0  |

Fig. 4

|     | T1 | T2 | T3 | T4 | T5 | T6 |
|-----|----|----|----|----|----|----|
| K-B | 1  | 0  | 1  | 0  | 0  | 1  |
| K-4 | 0  | 0  | 1  | 0  | 0  | 1  |
| K-5 | 0  | 0  | 1  | 0  | 1  | 1  |
| K-3 | 0  | 0  | 0  | 0  | 1  | 1  |
| K-0 | 0  | 0  | 0  | 0  | 0  | 0  |

Fig. 5

|     | T1 | T2 | T3 | T4 | T5 | T6 |
|-----|----|----|----|----|----|----|
| K-C | 0  | 0  | 1  | 1  | 1  | 0  |
| K-6 | 0  | 0  | 0  | 1  | 1  | 0  |
| K-7 | 0  | 0  | 0  | 0  | 1  | 0  |
| K-3 | 0  | 0  | 0  | 0  | 1  | 1  |
| K-O | 0  | 0  | 0  | 0  | 0  | 0  |

Fig. 6

|     | T1 | T2 | T3 | T4 | T5 | T6 |
|-----|----|----|----|----|----|----|
| K-D | 0  | 1  | 0  | 1  | 1  | 0  |
| K-8 | 0  | 1  | 0  | 0  | 1  | 0  |
| K-7 | 0  | 0  | 0  | 0  | 1  | 0  |
| K-3 | 0  | 0  | 0  | 0  | 1  | 1  |
| K-O | 0  | 0  | 0  | 0  | 0  | 0  |

Fig. 7

|     | T1 | T2 | T3 | T4 | T5 | T6 |
|-----|----|----|----|----|----|----|
| K-C | 0  | 0  | 1  | 1  | 1  | 0  |
| K-7 | 0  | 0  | 0  | 0  | 1  | 0  |
| K-3 | 0  | 0  | 0  | 0  | 1  | 1  |
| K-2 | 0  | 0  | 0  | 0  | 0  | 1  |
| K-O | 0  | 0  | 0  | 0  | 0  | 0  |

Fig. 8

|     | T1 | T2 | T3 | T4 | T5 | T6 |
| --- | --- | --- | --- | --- | --- | --- |
| K-0 | 0 | 1 | 0 | 1 | 1 | 0 |
| K-8 | 0 | 1 | 0 | 0 | 1 | 0 |
| K-9 | 0 | 1 | 0 | 0 | 1 | 1 |
| K-3 | 0 | 0 | 0 | 0 | 1 | 1 |
| K-0 | 0 | 0 | 0 | 0 | 0 | 0 |

Fig. 9

|      | T1 | T2 | T3 | T4 | T5 | T6 |             |
|------|----|----|----|----|----|----|-------------|
| K-A  | 1  | 1  | 0  | 0  | 0  | 1  |             |
| K-1  | 1  | 0  | 0  | 0  | 0  | 1  |             |
| K-2  | 0  | 0  | 0  | 0  | 0  | 1  |             |
| K-3  | 0  | 0  | 0  | 0  | 1  | 1  |             |
| K-5  | 0  | 0  | 1  | 0  | 1  | 1  | $i_{ac} > 0$ |
| K-10 | 0  | 0  | 1  | 0  | 0  | 0  |             |
| K-O  | 0  | 0  | 0  | 0  | 0  | 0  | $t > T_1$   |

Fig. 10

|  | T1 | T2 | T3 | T4 | T5 | T6 |  |
|---|---|---|---|---|---|---|---|
| K-C | 0 | 0 | 1 | 1 | 1 | 0 |  |
| K-6 | 0 | 0 | 0 | 1 | 1 | 0 |  |
| K-7 | 0 | 0 | 0 | 0 | 1 | 0 |  |
| K-3 | 0 | 0 | 0 | 0 | 1 | 1 |  |
| K-9 | 0 | 1 | 0 | 0 | 1 | 1 | $I_{ac} < 0$ |
| K-11 | 0 | 1 | 0 | 0 | 0 | 0 |  |
| K-O | 0 | 0 | 0 | 0 | 0 | 0 | $I_{ac2} = -I_{ac1}$ |

Fig. 11

METHOD FOR SWITCHING OFF POWER SEMICONDUCTOR SWITCHES IN A BRIDGE CIRCUIT, BRIDGE CIRCUIT, AND INVERTER COMPRISING A BRIDGE CIRCUIT

CROSS REFERENCE TO RELATED APPLICATIONS

This application is a continuation of International Patent Application number PCT/EP2020/054048, filed on Feb. 17, 2020, which claims priority to German Patent Application number 10 2019 104 145.7, filed on Feb. 19, 2019, and is hereby incorporated by reference in its entirety.

FIELD

The disclosure relates to a method for switching off power semiconductor switches in a bridge circuit. The disclosure also relates to a bridge circuit having a control unit configured to carry out such a method and to an inverter comprising such a bridge circuit.

BACKGROUND

Bridge circuits are used in power electronic converter circuits for converting from one form of current into another, for example in inverters for converting direct current into alternating current. Bridge circuits usually comprise an arrangement of a plurality of power semiconductor switches connected in series and/or in parallel, wherein linking points between the power semiconductor switches form connections of the bridge circuit. A different arrangement of different numbers of power semiconductor switches results in a multiplicity of different topologies of bridge circuits known to a person skilled in the art.

In order to convert from one form of current into another, the power semiconductor switches in the bridge circuits are switched on and off during operation according to particular switching patterns. In the event of a fault in particular, for example, when overcurrents or overvoltages occur, or during normal shutdown of the converter circuit, it is necessary to transfer all power semiconductor switches in the bridge circuit to a switched-off state, even as quickly as possible in the event of a fault. In this case, it is obvious and widespread according to the prior art to immediately and simultaneously change the control signals of all power semiconductor switches in the bridge circuit to a signal state that transfers the power semiconductor switches in the bridge circuit to a switched-off state.

On account of component tolerances, but in particular if power semiconductor switches of different technologies, for example field effect transistors and bipolar transistors, are used within a bridge circuit, the situation may arise in which individual power semiconductor switches in the bridge circuit are transferred to a switched-off state more quickly than others after having been controlled to be transferred to a switched-off state.

In bridge circuits in multi-level topologies, voltage levels linked to different potentials at input connections of the bridge circuit are applied to output connections of the bridge circuit as a matter of functional principle. As a result, if all power semiconductor switches in the bridge circuit are controlled at the same time, the situation may arise in which, on account of the above-mentioned different speeds of transferring different power semiconductor switches to a switched-off state, in conjunction with currents then occurring through free-wheeling diodes additionally present in the bridge circuit, higher voltages than during normal operation of the converter circuit are temporarily applied to individual power semiconductor switches in the bridge circuit. These higher voltages may possibly result in the destruction of the individual power semiconductor switches in the bridge circuit.

For example, the document EP2779345A1 discloses a bridge circuit in a three-level topology in which a first DC voltage connection is connected to a second DC voltage connection via a series circuit comprising four power semiconductor switches and in which the linking point between the second and third power semiconductor switches in the series circuit forms an AC connection. The linking points between the first and second power semiconductor switches in the series circuit and between the third and fourth power semiconductor switches in the series circuit are each connected, via a further power semiconductor switch, to a neutral connection, which therefore also forms a linking point of the two further power semiconductor switches. Such a bridge topology is also referred to as an ANPC bridge circuit (Active-Neutral-Point-Clamped bridge circuit).

In an ANPC bridge circuit, a split DC link circuit is usually connected to the DC voltage connections of the bridge circuit, wherein the center point of the split DC link circuit is connected to the neutral connection of the bridge circuit. During normal operation of an ANPC bridge circuit, at most half the DC link voltage is then applied to each of the power semiconductor switches. In contrast, if all power semiconductor switches are simultaneously controlled to be transferred to a switched-off state, the situation may arise in which the full DC link voltage, that is to say twice the value of the voltage occurring during operation, is applied to individual power semiconductor switches.

The above-mentioned document EP2779345A1 therefore describes different forms of switch-off processes in which the power semiconductor switches in an ANPC bridge circuit are controlled to be transferred to a switched-off state in a particular order and not at the same time. If the first or the fourth power semiconductor switch in the series circuit is in a switched-on state at the beginning of the switch-off process in this case, said switches are always transferred to a switched-off state before all other power semiconductor switches, that is to say first, over the course of the switch-off processes described in the above-mentioned document EP2779345A1.

With regard to establishing a safe state as quickly as possible in the event of a fault, it may be advantageous, when using power semiconductor switches of different technologies within the bridge circuit, to first of all control the second or third power semiconductor switch in the series circuit to be transferred to a switched-off state before all other power semiconductor switches, rather than the first or fourth power semiconductor switch, respectively, in the series circuit, as in the above-mentioned document EP2779345A1.

In the switch-off processes described in the above-mentioned document EP2779345A1, it is also not considered, in particular, that the potentials at the linking points between the first and second power semiconductor switches in the series circuit and between the third and fourth power semiconductor switches in the series circuit can float and, as a result, voltages of more than half the DC link voltage can be applied to individual power semiconductor switches over the course of the switch-off process.

SUMMARY

The present disclosure is directed to a method for switching off power semiconductor switches in a bridge circuit and a corresponding bridge circuit in which it is possible to establish a configuration in which all power semiconductor switches in the bridge circuit are in a switched-off state, without higher voltages than during normal operation of the bridge circuit occurring at individual power semiconductor switches over the course of the switch-off process.

A method according to the disclosure for switching off power semiconductor switches in a bridge circuit is disclosed. A first DC voltage connection of the bridge circuit is connected to a first intermediate point via a first power semiconductor switch, the first intermediate point is connected to an AC connection of the bridge circuit via a second power semiconductor switch, the AC connection is connected to a second intermediate point via a third power semiconductor switch and the second intermediate point is connected to a second DC voltage connection of the bridge circuit via a fourth power semiconductor switch. Further, a neutral connection of the bridge circuit is connected to the first intermediate point via a fifth power semiconductor switch and is connected to the second intermediate point via a sixth power semiconductor switch. The method comprises a switch-off process in which a configuration is established in which all power semiconductor switches in the bridge circuit are in a switched-off state. In doing so, over the course of the switch-off process a configuration is deliberately established in which the fifth power semiconductor switch and the sixth power semiconductor switch are simultaneously in a switched-on state, while the first power semiconductor switch and the fourth power semiconductor switch are in a switched-off state.

As a result of the fact that the fifth power semiconductor switch and the sixth power semiconductor switch are simultaneously in a switched-on state, this configuration causes both the potential at the first intermediate point between the first power semiconductor switch and the second power semiconductor switch and the potential at the second intermediate point between the third power semiconductor switch and the fourth power semiconductor switch to be permanently clamped to the potential present at the neutral connection of the bridge circuit and consequently to no longer be able to float. As a result, at most, the voltage applied between the first DC voltage connection and the neutral connection or the voltage applied between the second DC voltage connection and the neutral connection can be applied to each of the power semiconductor switches in the bridge circuit. The switched-off state of the first power semiconductor switch and of the fourth power semiconductor switch in this case prevents a short circuit between the first DC voltage connection and the neutral connection and between the second DC voltage connection and the neutral connection.

During normal operation of the bridge circuit, a configuration occurs, for example, in which the first power semiconductor switch, the sixth power semiconductor switch and either the second power semiconductor switch or the third power semiconductor switch are in a switched-on state and all other power semiconductor switches are in a switched-off state. Starting from such a configuration at the start of the switch-off process, the fifth power semiconductor switch can then be transferred to a switched-on state over the course of the switch-off process after the first power semiconductor switch has been transferred to a switched-off state over the course of the switch-off process in one embodiment of the method according to the disclosure.

In doing so, the first power semiconductor switch can be transferred to a switched-off state over the course of the switch-off process after the second power semiconductor switch or the third power semiconductor switch has been transferred to a switched-off state over the course of the switch-off process.

However, the second power semiconductor switch or the third power semiconductor switch can also be transferred to a switched-off state over the course of the switch-off process after the first power semiconductor switch has been transferred to a switched-off state over the course of the switch-off process.

Alternatively, the second power semiconductor switch or the third power semiconductor switch and the first power semiconductor switch can also be simultaneously controlled to be transferred to a switched-off state over the course of the switch-off process. The temporal relationship of the transfer to a switched-off state then results from the respective switching speed of the power semiconductor switches.

In a further embodiment of a method according to the disclosure, the second power semiconductor switch or the third power semiconductor switch is transferred to a switched-off state over the course of the switch-off process after the fifth power semiconductor switch has been transferred to a switched-on state over the course of the switch-off process. In conjunction with the condition that the fifth power semiconductor switch is transferred to a switched-on state over the course of the switch-off process after the first power semiconductor switch has been transferred to a switched-off state over the course of the switch-off process, the second power semiconductor switch or the third power semiconductor switch is also implicitly transferred to a switched-off state over the course of the switch-off process in this embodiment after the first power semiconductor switch has been transferred to a switched-off state over the course of the switch-off process.

During normal operation of the bridge circuit, a configuration also occurs, for example, in which the fourth power semiconductor switch, the fifth power semiconductor switch and either the second power semiconductor switch or the third power semiconductor switch are in a switched-on state and all other power semiconductor switches are in a switched-off state. Starting from such a configuration at the start of the switch-off process, in a further embodiment of the method according to the disclosure the sixth power semiconductor switch can then be transferred to a switched-on state over the course of the switch-off process after the fourth power semiconductor switch has been transferred to a switched-off state over the course of the switch-off process.

In doing so, the fourth power semiconductor switch can be transferred to a switched-off state over the course of the switch-off process after the second power semiconductor switch or the third power semiconductor switch has been transferred to a switched-off state over the course of the switch-off process.

However, the second power semiconductor switch or the third power semiconductor switch can also be transferred to a switched-off state over the course of the switch-off process after the fourth power semiconductor switch has been transferred to a switched-off state over the course of the switch-off process.

Alternatively, the second power semiconductor switch or the third power semiconductor switch and the fourth power semiconductor switch can also be simultaneously controlled to be transferred to a switched-off state over the course of the switch-off process. The temporal relationship of the transfer to a switched-off state then results from the respective switching speed of the power semiconductor switches.

In a further embodiment of a method according to the disclosure, the second power semiconductor switch or the third power semiconductor switch is transferred to a switched-off state over the course of the switch-off process after the sixth power semiconductor switch has been transferred to a switched-on state over the course of the switch-off process. In conjunction with the condition that the sixth power semiconductor switch is transferred to a switched-on state over the course of the switch-off process after the fourth power semiconductor switch has been transferred to a switched-off state over the course of the switch-off process, the second power semiconductor switch or the third power semiconductor switch is also implicitly transferred to a switched-off state over the course of the switch-off process in this embodiment after the fourth power semiconductor switch has been transferred to a switched-off state over the course of the switch-off process.

In one embodiment of the method according to the disclosure, the fifth power semiconductor switch and the sixth power semiconductor switch are transferred to a switched-off state over the course of the switch-off process after a configuration, in which the fifth power semiconductor switch and the sixth power semiconductor switch are in a switched-on state and all other power semiconductor switches are in a switched-off state, has been established over the course of the switch-off process.

In this case, over the course of the switch-off process, starting from the configuration in which the fifth power semiconductor switch and the sixth power semiconductor switch are in a switched-on state and all other power semiconductor switches are in a switched-off state, first of all, the third power semiconductor switch can be transferred to a switched-on state if a positive current is present at the AC connection, and the second power semiconductor switch can be transferred to a switched-on state if a negative current is present at the AC connection. The third power semiconductor switch and the second power semiconductor switch, respectively, are then transferred to a switched-off state again after the fifth power semiconductor switch and the sixth power semiconductor switch have been transferred to a switched-off state before this over the course of the switch-off process. A current direction as a positive current or negative current results in this case from the fact that a potential that is positive with respect to a potential at the neutral connection is applied to the first DC voltage connection and a potential that is negative with respect to the potential at the neutral connection is applied to the second DC voltage connection, and a current flow from a positive potential to a negative potential or to a potential at a neutral connection is referred to as a positive current and conversely a current flow from a negative potential to a positive potential or to a potential at a neutral connection is referred to as a negative current.

In the embodiment described before, the third power semiconductor switch or the second power semiconductor switch, respectively, can be transferred to a switched-off state over the course of the switch-off process after a predetermined time has elapsed since a point in time at which the fifth power semiconductor switch and the sixth power semiconductor switch were transferred to a switched-off state and/or a zero crossing of the current at the AC connection has occurred.

A bridge circuit according to the disclosure has a first power semiconductor switch, a second power semiconductor switch, a third power semiconductor switch, a fourth power semiconductor switch, a fifth power semiconductor switch and a sixth power semiconductor switch. A first DC voltage connection of the bridge circuit is connected to a first intermediate point via the first power semiconductor switch, the first intermediate point is connected to an AC connection of the bridge circuit via the second power semiconductor switch, the AC connection is connected to a second intermediate point via the third power semiconductor switch and the second intermediate point is connected to a second DC voltage connection of the bridge circuit via the fourth power semiconductor switch and furthermore a neutral connection of the bridge circuit is connected to the first intermediate point via the fifth power semiconductor switch and is connected to the second intermediate point via the sixth power semiconductor switch. A bridge circuit according to the disclosure further comprises a control unit or circuit for controlling the power semiconductor switches in the bridge circuit to be transferred from a switched-off state to a switched-on state and vice versa and the control unit is configured to carry out a method according to the disclosure.

In one embodiment of the bridge circuit according to the disclosure, the power semiconductor switches are configured in such a manner that the first power semiconductor switch in the switched-on state allows a current flow from the first DC voltage connection to the first intermediate point, the second power semiconductor switch in the switched-on state allows a current flow from the first intermediate point to the AC connection, and the third power semiconductor switch in the switched-on state allows a current flow from the AC connection to the second intermediate point. In addition, the fourth power semiconductor switch in the switched-on state allows a current flow from the second intermediate point to the second DC voltage connection, the fifth power semiconductor switch in the switched-on state allows a current flow from the first intermediate point to the neutral connection and the sixth power semiconductor switch in the switched-on state allows a current flow from the neutral connection to the second intermediate point. At the same time, an anti-parallel diode is respectively arranged for each power semiconductor switch and is respectively configured in such a manner that it allows a current flow opposite to the current flow direction that is enabled in the switched-on state of the respective power semiconductor switch.

In a further embodiment of the bridge circuit according to the disclosure, the second power semiconductor switch and the third power semiconductor switch are embodied as field effect transistors, in particular SiC MOSFETs, and the other power semiconductor switches are embodied as bipolar transistors, in particular IGBTs in Si technology.

An arrangement of power semiconductor switches like in a bridge circuit according to the disclosure is found, for example, in a so-called ANPC bridge circuit, which, as a three-level topology, applies three voltage levels to the AC voltage connection of the bridge circuit. However, the arrangement may also be part of a multi-level topology having even more than three voltage levels. In that case, further power semiconductor switches are connected in series with the first to fourth power semiconductor switches at the first DC voltage connection and at the second DC voltage connection, the linking points of which form further intermediate points, which in turn may be connected to the neutral connection of the bridge circuit or to further neutral connections of the bridge circuit via diodes or further power semiconductor switches. A teaching for controlling the further power semiconductor switches can be easily derived from the teaching of the present disclosure in that case, according to which a configuration, in which the power semiconductor switches connected to one of the possible plurality of neutral connections are simultaneously in a switched-on state, is deliberately established over the course of a switch-off process.

An inverter according to the disclosure comprises at least one bridge circuit according to the disclosure. Such an inverter according to the disclosure may be, for example, a single-phase inverter in which two bridge circuits according to the disclosure are also clocked in an offset manner, for example, but may also be, for example, a three-phase inverter in which at least three bridge circuits according to the disclosure are clocked in an offset manner.

In the present description of the method according to the disclosure, the mentioned temporal relationships of transfers to states always relate to the completion of a transfer to a switched-on or switched-off state, that is to say the processes for transferring to a switched-on or switched-off state may also quite well overlap in terms of time if the completion of the processes complies with the mentioned relationships. However, a control process to transfer a power semiconductor switch to a switched-on or switched-off state can also take place only when transfer of another power semiconductor switch to a switched-on or switched-off state that is required to be before has been completed.

BRIEF DESCRIPTION OF THE DRAWINGS

The disclosure is explained in more detail below on the basis of figures. In this case, the figures are used to illustrate embodiments of the disclosure but do not restrict the disclosure to the features shown.

FIG. 2 shows a table containing configurations of states of power semiconductor switches in a method according to the disclosure, FIG. 3 shows a table containing configurations of states of power semiconductor switches in a further embodiment of a method according to the disclosure, FIG. 4 shows a table containing configurations of states of power semiconductor switches in a further embodiment of a method according to the disclosure, FIG. 5 shows a table containing configurations of states of power semiconductor switches in a further embodiment of a method according to the disclosure, FIG. 6 shows a table containing configurations of states of power semiconductor switches in a further embodiment of a method according to the disclosure, FIG. 7 shows a table containing configurations of states of power semiconductor switches in a further embodiment of a method according to the disclosure, FIG. 8 shows a table containing configurations of states of power semiconductor switches in a further embodiment of a method according to the disclosure, FIG. 9 shows a table containing configurations of states of power semiconductor switches in a further embodiment of a method according to the disclosure, FIG. 10 shows a table containing configurations of states of power semiconductor switches in a further embodiment of a method according to the disclosure, FIG. 11 shows a table containing configurations of states of power semiconductor switches in a further embodiment of a method according to the disclosure.

DETAILED DESCRIPTION

Figure 1:
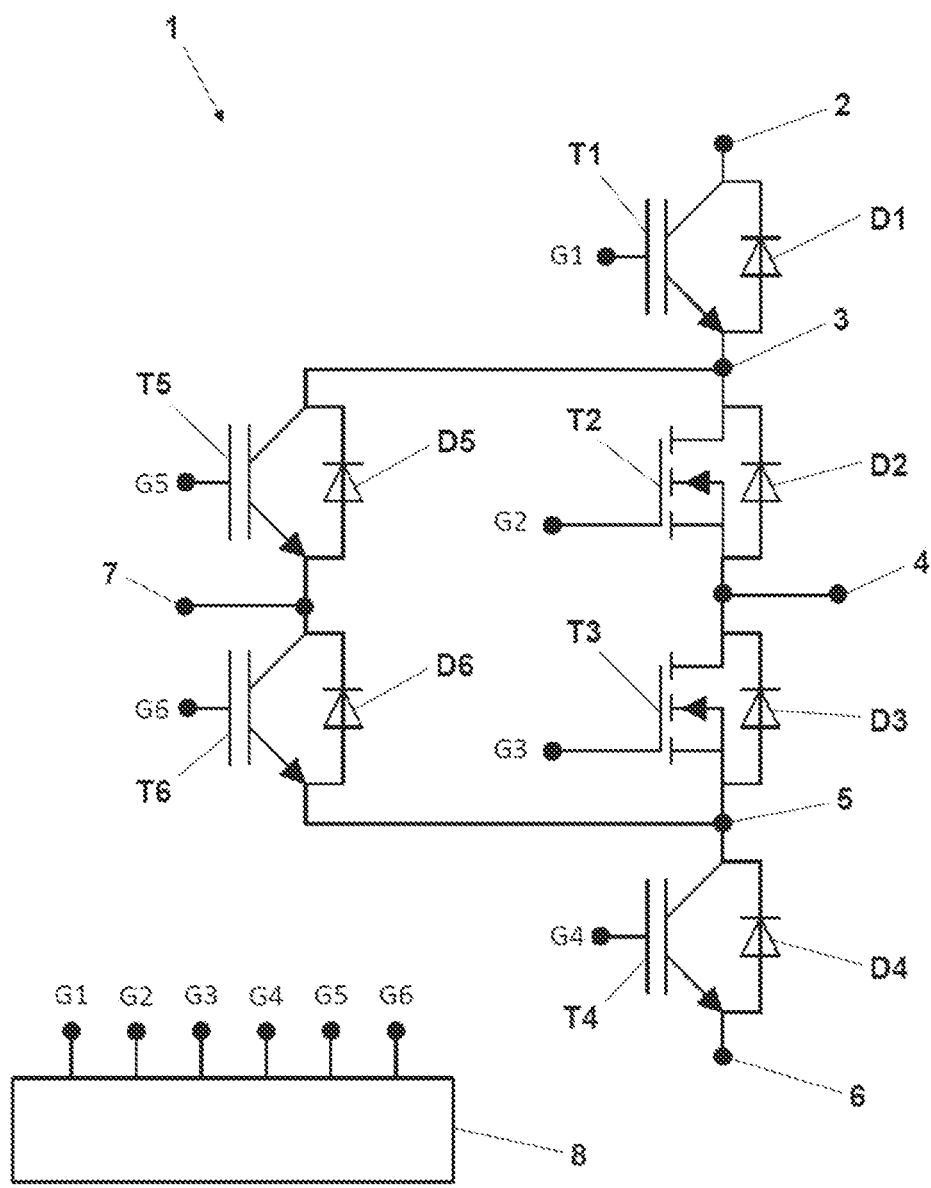
FIG. 1 shows a bridge circuit according to the disclosure.

FIG. 1 shows a bridge circuit 1 according to the disclosure in which a first DC voltage connection 2 of the bridge circuit 1 is connected to a second DC voltage connection 6 of the bridge circuit 1 via a series circuit comprising a first power semiconductor switch T1, a second power semiconductor switch T2, a third power semiconductor switch T3 and a fourth power semiconductor switch T4. A linking point between the first power semiconductor switch T1 and the second power semiconductor switch T2 forms a first intermediate point 3, and a linking point between the third power semiconductor switch T3 and the fourth power semiconductor switch T4 forms a second intermediate point 5. An AC connection 4 of the bridge circuit 1 is formed by a linking point between the second power semiconductor switch T2 and the third power semiconductor switch T3.

The power semiconductor switches T1 to T4 are configured in such a manner that the first power semiconductor switch T1 in the switched-on state allows a current flow from the first DC voltage connection 2 to the first intermediate point 3, the second power semiconductor switch T2 in the switched-on state allows a current flow from the first intermediate point 3 to the AC connection 4, the third power semiconductor switch T3 in the switched-on state allows a current flow from the AC connection 4 to the second intermediate point 5, and the fourth power semiconductor switch T4 in the switched-on state allows a current flow from the second intermediate point 5 to the second DC voltage connection 6. An anti-parallel diode D1 to D4 is respectively arranged for each of the power semiconductor switches T1 to T4 and respectively allows a current flow opposite to the current flow direction that is possible in the respective power semiconductor switch T1 to T4 in the switched-on state.

Arranged between the first intermediate point 3 and the second intermediate point 5 is a series circuit comprising a fifth power semiconductor switch T5 and a sixth power semiconductor switch T6, the linking point of which forms a neutral connection 7 of the bridge circuit 1. The power semiconductor switches T5 and T6 are configured in such a manner that the fifth power semiconductor switch T5 in the switched-on state allows a current flow from the first intermediate point 3 to the neutral connection 7 and the sixth power semiconductor switch T6 in the switched-on state allows a current flow from the neutral connection 7 to the second intermediate point 5. An anti-parallel diode D5 and D6 is respectively arranged for each of the power semiconductor switches T5 and T6 in such a manner that a current flow opposite to the current flow direction that is enabled in the switched-on state of the respective power semiconductor switch T5 or T6 is possible through the diodes D5 and D6.

A bridge circuit 1 according to the disclosure has a control unit or circuit 8 that supplies control signals G1 to G6 to the power semiconductor switches T1 to T6 via control inputs, which control signals are used to control the power semiconductor switches T1 to T6 to be transferred from a switched-off state to a switched-on state and vice versa. The control unit 8 is configured to switch the power semiconductor switches T1 to T6 on and off during normal operation using a control method. Various control methods are known to a person skilled in the art for this purpose. However, the control unit 8 is configured, in particular, to carry out a method according to the disclosure in order to use a switch-off process to establish a configuration in which the power semiconductor switches T1 to T6 are all in a switched-off state.

In one embodiment in FIG. 1, the second power semiconductor switch T2 and the third power semiconductor switch T3 are embodied as field-effect transistors, for example SiC MOSFETs, and the power semiconductor switches T1, T4, T5 and T6 are embodied as bipolar transistors, for example IGBTs in Si technology. Such a selection of the technologies of the power semiconductor switches T1 to T6 allows, for example, optimization of the bridge circuit with respect to switching losses and on-state losses of the power semiconductor switches T1 to T6 when selecting a control method in which, for example during normal operation, the power semiconductor switches T1, T4, T5 and T6 are switched on and off at the frequency of an alternating current present at the AC connection 4 and the power semiconductor switches T2 and T3 are switched on and off in a complementary manner with respect to one another using a pulse-width-modulated signal (PWM signal) that is at a high frequency in comparison.

When using another control method in which, for example depending on the sign of the voltage to be output at the AC connection 4, the first and third power semiconductor switches T1 and T3 or the fourth and second power semiconductor switches T4 and T2 are switched on and off in a complementary manner with respect to one another using a high-frequency PWM signal, while the respective others of the power semiconductor switches T1 to T6 are switched on and off at the frequency of the alternating current present at the AC connection 4, but also completely independently of the used control method, others of the power semiconductor switches T1 to T6, for example the power semiconductor switches T1 and T4 or the power semiconductor switches T1 to T4, may also be embodied as field-effect transistors and the respective others may be embodied as bipolar transistors. Also, all power semiconductor switches T1 to T6 may be embodied as field-effect transistors or all power semiconductor switches T1 to T6 may be embodied as bipolar transistors.

FIG. 2 illustrates, in the form of a table, a possible embodiment of a switch-off process in accordance with a method according to the disclosure, in which, starting from a configuration K-A that is present at the start of the switch-off process and in which the first, second and sixth power semiconductor switches T1, T2 and T6 are in a switched-on state and the third, fourth and fifth power semiconductor switches T3, T4 and T5 are in a switched-off state, a configuration K-O is established in which all power semiconductor switches T1 to T6 are in a switched-off state. For this purpose, a configuration K-1 is first of all established in which the second power semiconductor switch T2 has been transferred to a switched-off state. In a next act, the power semiconductor switch T1 is transferred to a switched-off state, thus resulting in a configuration K-2. In a third act, the fifth power semiconductor switch T5 is transferred to a switched-on state. This results in a configuration K-3 in which, as is characteristic of the method according to the disclosure, the fifth power semiconductor switch T5 and the sixth power semiconductor switch T6 are simultaneously in a switched-on state, while the first power semiconductor switch T1 and the fourth power semiconductor switch T4 are in a switched-off state. The fifth and sixth power semiconductor switches T5 and T6 are then transferred to a switched-off state in order to establish the configuration K-O. In doing this, as illustrated in the present example, the power semiconductor switches T5 and T6 can be simultaneously controlled to be transferred to the switched-off state, but they may also be controlled to be transferred to the switched-off state one after the other in arbitrary order.

FIG. 3 shows, in the form of a table, a further possibility of configurations over the course of a switch-off process in an embodiment of a method according to the disclosure. Starting from a configuration K-B that is present at the start of the switch-off process and in which the first, third and sixth power semiconductor switches T1, T3 and T6 are in a switched-on state and the second, fourth and fifth power semiconductor switches T2, T4 and T5 are in a switched-off state, the configuration K-O is established here by first of all establishing a configuration K-4 in which the first power semiconductor switch T1 has been transferred to a switched-off state. Subsequently transferring the third power semiconductor switch T3 to a switched-off state results in the configuration K-2, starting from which the configuration K-3 is established by transferring the fifth power semiconductor switch T5 to a switched-on state. In order to establish the configuration K-O, the fifth and sixth power semiconductor switches T5 and T6 are then transferred to a switched-off state by means of simultaneous control. Alternatively, the power semiconductor switches T5 and T6 may also be controlled in such a manner that they are transferred to a switched-off state one after the other in arbitrary order.

FIG. 4 shows a further embodiment with configurations of states of power semiconductor switches in a method according to the disclosure. Starting from the configuration K-A that is present at the start of the switch-off process, the configuration K-O is established here, in a first act for establishing the configuration K-2, by simultaneously controlling the first and second power semiconductor switches T1 and T2 to be transferred to a switched-off state, rather than transferring them to a switched-off state one after the other as in the preceding embodiments. On the basis of this, the configuration K-3 is then established by transferring the fifth power semiconductor switch T5 to a switched-on state. The configuration K-O is then reached in the present embodiment by first of all establishing the configuration K-2 by transferring the fifth power semiconductor switch T5 to a switched-off state and then establishing the configuration K-O in a further act by transferring the sixth power semiconductor switch T6 to a switched-off state, rather than by simultaneously controlling the fifth and sixth power semiconductor switches T5 and T6 to be transferred to a switched-off state as in the previous embodiments. It is of course equally possible to first of all transfer the sixth power semiconductor switch T6 and then the fifth power semiconductor switch T5 to a switched-off state in order to establish the configuration K-O.

In the embodiment of configurations over the course of a switch-off process in a method according to the disclosure, as illustrated in FIG. 5, starting from the configuration K-B that is present at the start of the switch-off process, the configuration K-O is established by first of all establishing the configuration K-4 by transferring the first power semiconductor switch T1 to a switched-off state. In a next act, a configuration K-5 is then established by transferring the fifth power semiconductor switch T5 to a switched-on state, and the configuration K-3 is established in a further act by transferring the third power semiconductor switch T3 to a switched-off state. In the present embodiment, the third power semiconductor switch T3 is, thus, transferred to a switched-off state after the fifth power semiconductor switch T5 has been transferred to a switched-on state over the course of the switch-off process. In the present embodiment, in the form of the configurations K-5 and K-3, this results in two configurations in which, as is characteristic of the method according to the disclosure, the fifth power semiconductor switch T5 and the sixth power semiconductor switch T6 are simultaneously in a switched-on state, while the first power semiconductor switch T1 and the fourth power semiconductor switch T4 are in a switched-off state. The configuration K-O is finally established by transferring the fifth and sixth power semiconductor switches T5 and T6 to a switched-off state, for example by means of simultaneous control in the present case.

The embodiment in FIG. 6 shows, in the form of a table, a switch-off process in accordance with a method according to the disclosure, in which the configuration K-O is established starting from a configuration K-C that is present at the start of the switch-off process and in which the third, fourth and fifth power semiconductor switches T3, T4 and T5 are in a switched-on state and the first, second and sixth power semiconductor switches T1, T2 and T6 are in a switched-off state. In order to achieve this, a configuration K-6 is first of all established by transferring the third power semiconductor switch T3 to a switched-off state and, in a next act, a configuration K-7 is established in which the fourth power semiconductor switch T4 has been transferred to a switched-off state. Transferring the sixth power semiconductor switch T6 to a switched-on state then results in the configuration K-3, from which the configuration K-O is established by transferring the fifth and sixth power semiconductor switches T5 and T6 to a switched-off state, here by means of simultaneous control for example.

In the embodiment in FIG. 7, starting from a configuration K-D that is present at the start of the switch-off process and in which the second, fourth and fifth power semiconductor switches T2, T4 and T5 are in a switched-on state and the first, third and sixth power semiconductor switches T1, T3 and T6 are in a switched-off state, the configuration K-O is established by first of all establishing a configuration K-8 in which the fourth power semiconductor switch T4 has been transferred to a switched-off state, then establishing the configuration K-7 by transferring the second power semiconductor switch T2 to a switched-off state, establishing the configuration K-3 by transferring the sixth power semiconductor switch T6 to a switched-on state and finally establishing the configuration K-O by transferring the fifth and sixth power semiconductor switches T5 and T6 to a switched-off state, by simultaneously controlling T5 and T6 in the present embodiment.

FIG. 8 illustrates, in the form of a table, a further embodiment with configurations of states of power semiconductor switches in a method according to the disclosure. Starting from the configuration K-C that is present at the start of the switch-off process, the configuration K-O is established here by simultaneously controlling the third and fourth power semiconductor switches T3 and T4 to be transferred to a switched-off state in a first act, which then results in the configuration K-7. On the basis of this, the configuration K-3 is then established by transferring the sixth power semiconductor switch T6 to a switched-on state. The configuration K-O is then reached by first of all establishing the configuration K-2 by transferring the fifth power semiconductor switch T5 to a switched-off state and then establishing the configuration K-O in a further act by transferring the sixth power semiconductor switch T6 to a switched-off state. Alternatively, it is of course also possible to first transfer the sixth power semiconductor switch T6 and then the fifth power semiconductor switch T5 to a switched-off state in order to establish the configuration K-O or alternatively to also simultaneously control both power semiconductor switches T5 and T6 to be transferred to a switched-off state, as in the embodiments in FIGS. 2, 3, 5, 6 and 7, for example.

The embodiment in FIG. 9 shows configurations over the course of a switch-off process in a method according to the disclosure, in which, starting from the configuration K-D that is present at the start of the switch-off process, the configuration K-O is established by first of all establishing the configuration K-8 by transferring the fourth power semiconductor switch T4 to a switched-off state. In a next act, a configuration K-9 is then established by transferring the sixth power semiconductor switch T6 to a switched-on state, and the configuration K-3 is established in a further act by transferring the second power semiconductor switch T2 to a switched-off state. Over the course of this switch-off process, the second power semiconductor switch T2 is, thus, transferred to a switched-off state after the sixth power semiconductor switch T6 has been transferred to a switched-on state. In the present embodiment, in the form of the configurations K-9 and K-3, this results in two configurations in which, as is characteristic of the method according to the disclosure, the fifth power semiconductor switch T5 and the sixth power semiconductor switch T6 are simultaneously in a switched-on state, while the first power semiconductor switch T1 and the fourth power semiconductor switch T4 are in a switched-off state. The configuration K-O is finally established by transferring the fifth and sixth power semiconductor switches T5 and T6 to a switched-off state, for example by means of simultaneous control in the present case.

FIG. 10 illustrates a further embodiment of a method according to the disclosure in which, for example starting from the configuration K-A that is present at the start of the switch-off process, the configuration K-3 is established over the course of the switch-off process via the configurations K-1 and K-2. On the basis of this, on account of the presence of a positive current Iac at the AC connection 4 of the bridge circuit 1, the configuration K-5 is then established by transferring the third power semiconductor switch T3 to a switched-on state. A configuration K-10 is then established by transferring the fifth and sixth power semiconductor switches T5 and T6 to a switched-off state, by means of simultaneous control in the present case, and finally the third power semiconductor switch T3 is transferred to a switched-off state again after a predefined period T1 after the establishment of the configuration K-10 has elapsed and the configuration K-O is thereby established. As an alternative or in addition to a predefined period T1, a zero crossing of the current Iac at the AC connection 4 of the bridge circuit 1 after establishing the configuration K-10 can also be used as a criterion for transferring from the configuration K-10 to the configuration K-O.

In the embodiment of a method according to the disclosure in FIG. 11, for example starting from the configuration K-C that is present at the start of the switch-off process, the configuration K-3 is first of all established over the course of the switch-off process via the configurations K-6 and K-7. On account of the presence of a negative current Iac at the AC connection 4 of the bridge circuit 1, the configuration K-9 is then established by transferring the second power semiconductor switch T2 to a switched-on state. A configuration K-11 is then established by transferring the fifth and sixth power semiconductor switches T5 and T6 to a switched-off state, by means of simultaneous control in the present case, and, after a zero crossing of the current Iac at the AC connection 4 of the bridge circuit 1 has occurred after the configuration K-11 has been established, the configuration K-O is established by transferring the second power semiconductor switch T2 to a switched-off state again. As an alternative or in addition to a zero crossing of the current Iac at the AC connection 4 of the bridge circuit 1, an elapse of a predefined period T1 after the establishment of the configuration K-10 can also be used as a criterion for transferring from the configuration K-10 to the configuration K-O.

In addition to the embodiments illustrated in FIGS. 2 to 11, it is also possible to derive a plurality of further variants of switch-off processes that are used to establish the configuration K-O in a method according to the disclosure, starting from a configuration K-A, K-B, K-C or K-D that is present at the start of the switch-off process, and depending on the control method used during normal operation of the bridge circuit 1 according to the disclosure and other configurations that are present at the start of the switch-off process, wherein these switch-off processes comprise at least one of the configurations K-3, K-5 and K-9 in which, as is characteristic of the method according to the disclosure, the fifth power semiconductor switch T5 and the sixth power semiconductor switch T6 are simultaneously in a switched-on state, while the first power semiconductor switch T1 and the fourth power semiconductor switch T4 are in a switched-off state.

In the method according to the disclosure, it is advantageous if, after each transfer from one configuration to the next, the method waits until transient processes in the currents and potentials within the bridge circuit 1 have finished before the power semiconductor switches T1 to T6 are controlled to be transferred to the respective next configuration. This is advantageous, in particular, in the configurations K-3, K-5 and K-9 in order to ensure defined values of the potentials at the intermediate points 3 and 5.

Figure 12:
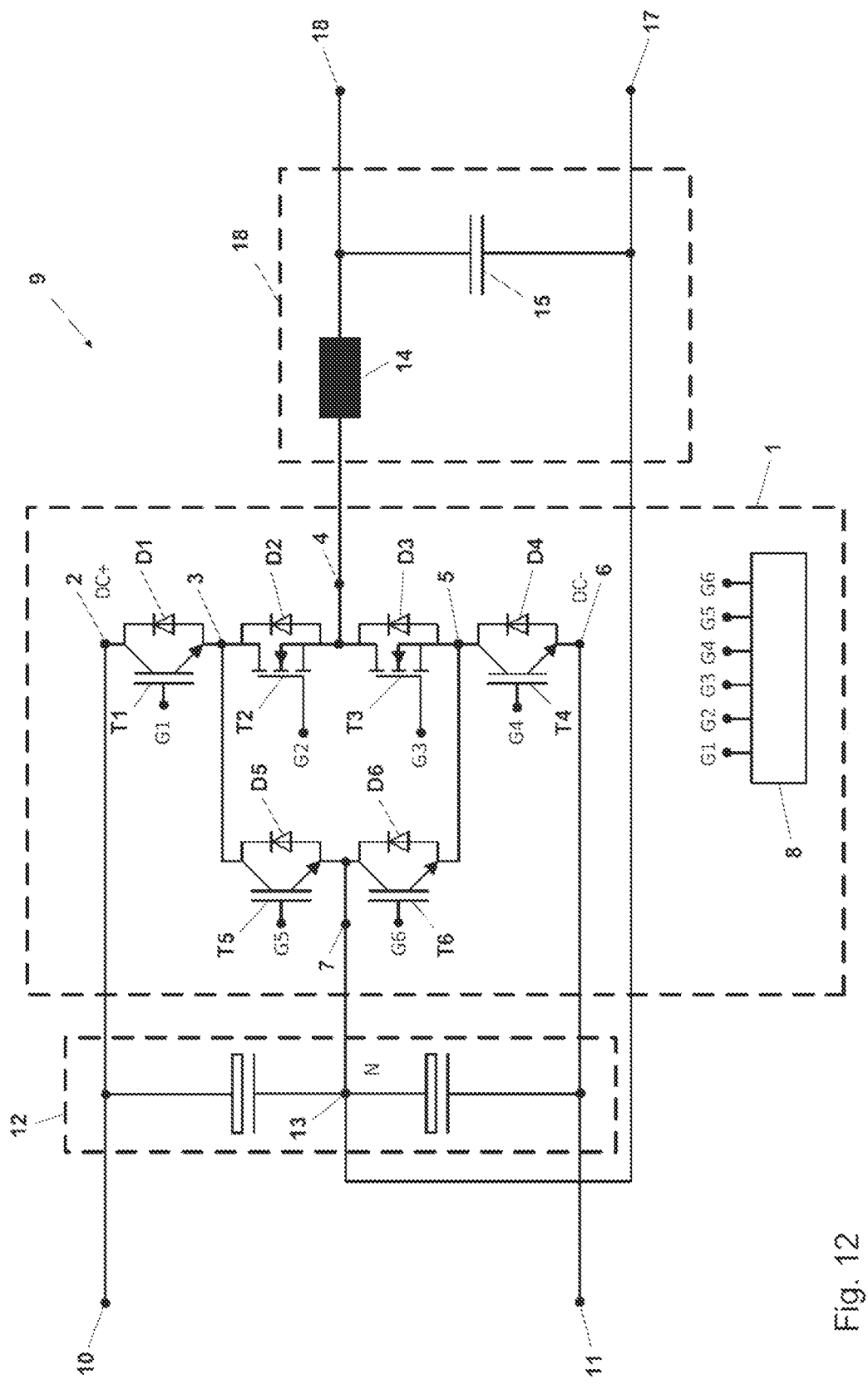
FIG. 12 shows an inverter according to the disclosure.

FIG. 12 illustrates an inverter 9 according to the disclosure. The latter first of all has a bridge circuit 1 according to the disclosure. A split DC link circuit 12 is arranged between the first DC voltage connection 2 of the bridge circuit 1, which is connected to a first input connection 10 of the inverter 9, and the second DC voltage connection 6 of the bridge circuit 1, which is connected to a second input connection 11 of the inverter 9. The neutral connection 7 of the bridge circuit 1 is connected to a center point 13 of the split DC link circuit 12. The AC connection 4 of the bridge circuit 1 is connected to a first output connection 16 of the inverter 9 via an inductor 14. A capacitor 15 is arranged between the first output connection 16 and a second output connection 17 of the inverter 9, which is connected to the neutral connection 7 of the bridge circuit 1. The capacitor 15 and the inductor 14 together form a line filter 18 of the inverter 9.

In the inverter 9 illustrated in FIG. 12, a so-called neutral potential N is present at the neutral connection 7 of the bridge circuit 1 and, in contrast, a positive potential DC+ is present at the first DC voltage connection 2 of the bridge circuit 1 and a negative potential DC− is present at the second DC voltage connection 6 of the bridge circuit 1.

In the present example, the inverter 9 in FIG. 12 is embodied as a single-phase inverter that comprises one bridge circuit 1 according to the disclosure. However, an inverter according to the disclosure, embodied as a single-phase inverter, may also have two bridge circuits 1 according to the disclosure that are controlled in an offset manner and the first DC voltage connections 2 and second DC voltage connections 6 of which are connected. An inverter according to the disclosure may also be embodied as a three-phase inverter, which then has at least three bridge circuits 1 according to the disclosure that are controlled in an offset manner and the first DC voltage connections 2 and second DC voltage connections 6 of which are connected.

The disclosure is not restricted to the explicitly shown embodiments, but rather can be modified in various ways, in particular can be combined with other embodiments that are shown or are known to a person skilled in the art.

The invention claimed is:

1. A method for switching off power semiconductor switches in a bridge circuit, in which a first DC voltage connection of the bridge circuit is connected to a first intermediate point via a first power semiconductor switch, the first intermediate point is connected to an AC connection of the bridge circuit via a second power semiconductor switch, the AC connection is connected to a second intermediate point via a third power semiconductor switch and the second intermediate point is connected to a second DC voltage connection of the bridge circuit via a fourth power semiconductor switch, and in which a neutral connection of the bridge circuit is connected to the first intermediate point via a fifth power semiconductor switch and is connected to the second intermediate point via a sixth power semiconductor switch, wherein the method comprises a switch-off process, comprising:
establishing a final switch configuration in which all power semiconductor switches in the bridge circuit are in a switched-off state, wherein during a portion of the switch-off process, a switch configuration is established in which the fifth power semiconductor switch and the sixth power semiconductor switch are concurrently in a switched-on state, while the first power semiconductor switch and the fourth power semiconductor switch are in a switched-off state.

2. The method as claimed in claim 1, wherein, starting from a switch configuration that is present at a start of the switch-off process in which the first power semiconductor switch, the sixth power semiconductor switch and either the second power semiconductor switch or the third power semiconductor switch are in a switched-on state and all other power semiconductor switches are in a switched-off state, transferring the fifth power semiconductor switch to a switched-on state during the switch-off process after the first power semiconductor switch has been transferred to a switched-off state during the switch-off process.

3. The method as claimed in claim 2, further comprising transferring the first power semiconductor switch to a switched-off state during the switch-off process after the second power semiconductor switch or the third power semiconductor switch has been transferred to a switched-off state during the switch-off process.

4. The method as claimed in claim 2, further comprising transferring the second power semiconductor switch or the third power semiconductor switch to a switched-off state during the switch-off process after the first power semiconductor switch has been transferred to a switched-off state during the switch-off process.

5. The method as claimed in claim 2, further comprising controlling the second power semiconductor switch or the third power semiconductor switch and the first power semiconductor switch concurrently to be transferred to a switched-off state during the switch-off process.

6. The method as claimed in claim 2, further comprising transferring the second power semiconductor switch or the third power semiconductor switch to a switched-off state during the switch-off process after the fifth power semiconductor switch has been transferred to a switched-on state during the switch-off process.

7. The method as claimed in claim 1, wherein, starting from a configuration that is present at a start of the switch-off process in which the fourth power semiconductor switch, the fifth power semiconductor switch and either the second power semiconductor switch or the third power semiconductor switch are in a switched-on state and all other power semiconductor switches are in a switched-off state, transferring the sixth power semiconductor switch to a switched-on state during the switch-off process after the fourth power semiconductor switch has been transferred to a switched-off state during the switch-off process.

8. The method as claimed in claim 7, further comprising transferring the fourth power semiconductor switch to a switched-off state during the switch-off process after the second power semiconductor switch or the third power semiconductor switch has been transferred to a switched-off state during the switch-off process.

9. The method as claimed in claim 7, further comprising transferring the second power semiconductor switch or the third power semiconductor switch to a switched-off state during the switch-off process after the fourth power semiconductor switch has been transferred to a switched-off state during the switch-off process.

10. The method as claimed in claim 7, further comprising controlling the second power semiconductor switch or the third power semiconductor switch and the fourth power semiconductor switch concurrently to be transferred to a switched-off state during the switch-off process.

11. The method as claimed in claim 7, further comprising transferring the second power semiconductor switch or the third power semiconductor switch to a switched-off state during the switch-off process after the sixth power semiconductor switch has been transferred to a switched-on state during the switch-off process.

12. The method as claimed in claim 1, wherein the fifth power semiconductor switch and the sixth power semiconductor switch are transferred to a switched-off state during the switch-off process after a switch configuration in which the fifth power semiconductor switch and the sixth power semiconductor switch are in a switched-on state and all other power semiconductor switches are in a switched-off state.

13. The method as claimed in claim 12, further comprising applying a potential that is positive with respect to a potential at the neutral connection to the first DC voltage connection and a potential that is negative with respect to the potential at the neutral connection to the second DC voltage connection, and wherein, after a switch configuration in which the fifth power semiconductor switch and the sixth power semiconductor switch are in a switched-on state and all other power semiconductor switches are in a switched-off state, transferring the third power semiconductor switch to a switched-on state if a positive current is present at the AC connection, and transferring the second power semiconductor switch to a switched-on state if a negative current is present at the AC connection, and transferring the third power semiconductor switch or the second power semiconductor switch, respectively, to a switched-off state again after the fifth power semiconductor switch and the sixth power semiconductor switch have been transferred before to a switched-off state during the switch-off process.

14. The method as claimed in claim 13, further comprising transferring the third power semiconductor switch or the second power semiconductor switch, respectively, to a switched-off state during the switch-off process after a predetermined time has elapsed since a point in time at which the fifth power semiconductor switch and the sixth power semiconductor switch were transferred to a switched-off state and/or a zero crossing of the current at the AC connection has occurred.

15. A bridge circuit having a first power semiconductor switch, a second power semiconductor switch, a third power semiconductor switch, a fourth power semiconductor switch, a fifth power semiconductor switch and a sixth power semiconductor switch, wherein a first DC voltage connection of the bridge circuit is connected to a first intermediate point via the first power semiconductor switch, the first intermediate point is connected to an AC connection of the bridge circuit via the second power semiconductor switch, the AC connection is connected to a second intermediate point via the third power semiconductor switch and the second intermediate point is connected to a second DC voltage connection of the bridge circuit via the fourth power semiconductor switch and furthermore a neutral connection of the bridge circuit is connected to the first intermediate point via the fifth power semiconductor switch and is connected to the second intermediate point via the sixth power semiconductor switch, and further comprising a control circuit configured to control the power semiconductor switches in the bridge circuit to be transferred from a switched-off state to a switched-on state and vice versa, wherein the control circuit is configured to:
establish in a switch-off process a final switch configuration in which all power semiconductor switches in the bridge circuit are in a switched-off state, wherein during a portion of the switch-off process, a switch configuration is established in which the fifth power semiconductor switch and the sixth power semiconductor switch are concurrently in a switched-on state, while the first power semiconductor switch and the fourth power semiconductor switch are in a switched-off state.

16. The bridge circuit as claimed in claim 15, wherein the power semiconductor switches are arranged such that the first power semiconductor switch in the switched-on state allows a current flow from the first DC voltage connection to the first intermediate point, the second power semiconductor switch in the switched-on state allows a current flow from the first intermediate point to the AC connection, the third power semiconductor switch in the switched-on state allows a current flow from the AC connection to the second intermediate point, the fourth power semiconductor switch in the switched-on state allows a current flow from the second intermediate point to the second DC voltage connection, the fifth power semiconductor switch in the switched-on state allows a current flow from the first intermediate point to the neutral connection and the sixth power semiconductor switch in the switched-on state allows a current flow from the neutral connection to the second intermediate point, and further comprising an anti-parallel diode respectively arranged for each power semiconductor switch to allow a current flow opposite to the current flow direction that is enabled in the switched-on state of the respective power semiconductor switch.

17. The bridge circuit as claimed in claim 15, wherein the second power semiconductor switch and the third power semiconductor switch comprise field effect transistors and the other power semiconductor switches comprise bipolar transistors.

18. An inverter comprising at least one bridge circuit, comprising a first power semiconductor switch, a second power semiconductor switch, a third power semiconductor switch, a fourth power semiconductor switch, a fifth power semiconductor switch and a sixth power semiconductor switch, wherein a first DC voltage connection of the bridge circuit is connected to a first intermediate point via the first power semiconductor switch, the first intermediate point is connected to an AC connection of the bridge circuit via the second power semiconductor switch, the AC connection is connected to a second intermediate point via the third power semiconductor switch and the second intermediate point is connected to a second DC voltage connection of the bridge circuit via the fourth power semiconductor switch and furthermore a neutral connection of the bridge circuit is connected to the first intermediate point via the fifth power semiconductor switch and is connected to the second intermediate point via the sixth power semiconductor switch, and further comprising a control circuit configured to control the power semiconductor switches in the bridge circuit to be transferred from a switched-off state to a switched-on state and vice versa, wherein the control unit is configured to:

establish in a switch-off process a final switch configuration in which all power semiconductor switches in the bridge circuit are in a switched-off state, wherein during a portion of the switch-off process, a switch configuration is established in which the fifth power semiconductor switch and the sixth power semiconductor switch are concurrently in a switched-on state, while the first power semiconductor switch and the fourth power semiconductor switch are in a switched-off state.

* * * * *